UNITED STATES PATENT OFFICE.

OSCAR BALLY, OF MANNHEIM, ASSIGNOR TO THE BADISCHE ANILIN AND SODA FABRIK, OF LUDWIGSHAFEN, GERMANY.

BLUE DYE.

SPECIFICATION forming part of Letters Patent No. 524,235, dated August 7, 1894.

Application filed May 12, 1894. Serial No. 511,032. (Specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of a New Mordant-Dyeing Coloring-Matter, of which the following is a specification.

My invention relates to the manufacture of a new coloring-matter which fixes itself on the metallic mordants giving very fast shades of color. The said coloring-matter can be obtained by the condensation of gallic acid with dialkyl-anilin, under the influence of suitable reagents such as the chlorids and oxychlorids of phosphorus with or without the addition of zinc-chlorid and the like.

My new coloring-matter possesses the following properties: When dried its powder has a coppery luster, it is but slightly soluble in cold water, more soluble on boiling, its solution in dilute acetic acid is green; in glacial acetic acid, violet; in concentrated sulfuric acid, reddish yellow; in sodium carbonate solution, violet; in caustic soda, dirty violet-red liable to change on exposure to air; in alcohol, violet; in ether my new dye is almost insoluble, also in cold benzene, but on heating with this solvent a little dissolves giving a red solution.

The following example will serve to illustrate the nature of my invention and the manner in which it can best be carried into practical effect and my new coloring-matter obtained. The parts are by weight.

Example: Mix about ten (10) parts of gallic acid with about forty (40) parts of dimethyl-anilin in an enameled vessel fitted with a stirrer. These compounds must both be free from water. Next run in about forty (40) parts of phosphorus oxychlorid. The mixture becomes hot spontaneously and a violent reaction takes place; when this has somewhat subsided add slowly about forty (40) parts of chlorid of zinc, and continue stirring until the frothing of the mixture ceases. Then dilute the melt carefully with about two hundred (200) parts of water and pour the whole into about one thousand (1,000) parts of water. Add sodium acetate, filter off the dye which is obtained as a dark precipitate, wash and preserve for use in the form of paste.

My new dye gives very bright blue shades, fast against the action of light, on chrome-mordanted wool.

In the above example diethyl-anilin may be used instead of dimethyl-anilin when substantially the same product is obtained, the slight difference in chemical constitution making no difference to the practical qualities of the coloring-matter.

Now, what I claim is—

1. As a new article of manufacture the new coloring-matter such as can be derived from gallic acid and dialkyl-anilin, which occurs as a dark colored paste and in the dry form as a coppery-lustered powder, slightly soluble in cold water, more soluble on boiling, and which gives a violet solution in alcohol, a reddish yellow solution in concentrated sulfuric acid and is almost insoluble in ether.

2. The new process for the manufacture of coloring-matter consisting in heating together gallic acid and the dialkyl-anilins hereinbefore mentioned in the presence of the condensing reagents such as phosphorus oxychlorid and afterward chlorid of zinc substantially as described.

In testimony whereof I have hereunto set my hand in the presence of two subscribing witnesses.

OSCAR BALLY.

Witnesses:
ERNEST F. EHRHARDT,
ADOLPH REUTLINGER.